(12) United States Patent
Takahira et al.

(10) Patent No.: US 8,962,136 B2
(45) Date of Patent: Feb. 24, 2015

(54) PRESSURE-SENSITIVE ADHESIVE SHEET FOR SURFACE PROTECTION

(75) Inventors: Hitoshi Takahira, Osaka (JP); Satomi Yoshie, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/502,146

(22) PCT Filed: Oct. 20, 2010

(86) PCT No.: PCT/JP2010/068450
§ 371 (c)(1),
(2), (4) Date: Apr. 16, 2012

(87) PCT Pub. No.: WO2011/049111
PCT Pub. Date: Apr. 28, 2011

(65) Prior Publication Data
US 2012/0202058 A1    Aug. 9, 2012

(30) Foreign Application Priority Data
Oct. 20, 2009 (JP) ................................. 2009-241717

(51) Int. Cl.
| C09J 167/02 | (2006.01) |
| C09J 7/02 | (2006.01) |
| C09J 11/06 | (2006.01) |
| C08G 63/16 | (2006.01) |
| C08G 18/79 | (2006.01) |
| C08G 18/42 | (2006.01) |
| C09J 167/00 | (2006.01) |
| C08G 63/60 | (2006.01) |

(52) U.S. Cl.
CPC .......... *C08G 18/791* (2013.01); *C08G 18/4202* (2013.01); *C08G 18/428* (2013.01); *C09J 7/0246* (2013.01); *C09J 167/00* (2013.01); *C08G 63/60* (2013.01); *C08G 2170/40* (2013.01); *C09J 2467/00* (2013.01)
USPC .......... 428/355 N; 428/343; 428/480

(58) Field of Classification Search
None
See application file for complete search history.

(56) References Cited

U.S. PATENT DOCUMENTS

| 5,840,827 | A | * | 11/1998 | Zupancic et al. ............. 528/272 |
| 6,001,891 | A | | 12/1999 | Higuchi et al. |
| 6,096,809 | A | | 8/2000 | Lorcks et al. .................. 524/47 |
| 6,235,816 | B1 | | 5/2001 | Lorcks et al. .................. 524/47 |
| 6,803,443 | B1 | * | 10/2004 | Ariga et al. .................. 528/354 |
| 7,005,002 | B2 | * | 2/2006 | Glockner et al. .......... 106/31.13 |
| 7,053,145 | B1 | * | 5/2006 | Tasaka et al. ................. 524/436 |
| 7,070,051 | B2 | * | 7/2006 | Kanner et al. ................. 206/382 |
| 7,495,059 | B2 | * | 2/2009 | Schumann et al. ........... 525/453 |

| 2004/0186247 | A1 | * | 9/2004 | Vandevoorde ................ 525/454 |
| 2008/0087196 | A1 | | 4/2008 | Anderson et al. .......... 106/162.9 |
| 2008/0213584 | A1 | | 9/2008 | Anderson et al. ............. 428/355 |
| 2011/0135924 | A1 | | 6/2011 | Takahira et al. |
| 2011/0244221 | A1 | | 10/2011 | Hayashi et al. |
| 2011/0244227 | A1 | | 10/2011 | Hayashi et al. |
| 2011/0287240 | A1 | | 11/2011 | Ikishima et al. |
| 2011/0287253 | A1 | | 11/2011 | Hayashi et al. |
| 2012/0064339 | A1 | | 3/2012 | Yamagata et al. |

FOREIGN PATENT DOCUMENTS

| CN | 1181098 | 5/1998 |
| CN | 101517026 | 8/2009 |
| EP | 0 882 749 | 12/1998 |
| EP | 2 065 421 | 6/2009 |
| JP | 04-328186 | 11/1992 |
| JP | 08003297 A * | 1/1996 |
| JP | 10-237401 | 9/1998 |
| JP | 11-60716 | 3/1999 |
| JP | 2000-160125 | 6/2000 |
| JP | 2004-231797 | 8/2004 |
| JP | 2004231797 A * | 8/2004 |
| JP | 3702677 | 7/2005 |
| JP | 2007-308626 | 11/2007 |
| JP | 2008-013593 | 1/2008 |
| JP | 2008-195819 | 8/2008 |
| WO | 2010/016514 | 2/2010 |

OTHER PUBLICATIONS

Machine translation of JP 08003297 A (1996).*
Humna translation of JP 2004231797A (2004).*
Human translation of JP 08003297A (1996).*
U.S. Appl. No. 13/493,222 to Akifumi Kido et al., filed Jun. 11, 2012.
U.S. Appl. No. 13/493,252 to Akifumi Kido et al., filed Jun. 11, 2012.
U.S. Appl. No. 13/362,097 to Kenichi Kataoka et al., filed Jan. 31, 2012.
U.S. Appl. No. 13/508,641 to Hitoshi Takahira et al., filed May 8, 2012.
U.S. Appl. No. 13/502,178 to Satomi Yoshie et al., filed Apr. 16, 2012.
U.S. Appl. No. 13/502,238 to Satomi Yoshie et al., filed Apr. 16, 2012.
U.S. Appl. No. 13/502,289 to Hitoshi Takahira et al., filed Apr. 16, 2012.
U.S. Appl. No. 13/493,099 to Shou Uchida et al., filed Jun. 11, 2012.
Search report from International Patent Application No. PCT/JP2010/068450, mail date is Dec. 7, 2010.

(Continued)

*Primary Examiner* — Frank D Ducheneaux
(74) *Attorney, Agent, or Firm* — Greenblum & Bernstein, P.L.C.

(57) ABSTRACT

A surface-protecting pressure-sensitive adhesive sheet includes: a substrate; and a pressure-sensitive adhesive layer that is provided on at least one side of the substrate and made from a polyester-based pressure-sensitive adhesive composition containing a crosslinking agent and a polyester including at least a lactic acid unit, a dibasic acid unit, and a glycol unit. The dibasic acid unit includes a dimer acid, the polyester has a weight average molecular weight of 20,000 to 200,000 and a glass transition temperature of −70 to −20° C. as measured using a differential scanning calorimeter at a temperature rise rate of 20° C./minute, the polyester-based pressure-sensitive adhesive composition has a hydroxyl value of 20 to 60 mgKOH/g, and the pressure-sensitive adhesive layer has a gel fraction of 85 to 99% by weight.

9 Claims, No Drawings

(56) References Cited

OTHER PUBLICATIONS

Search report from International Preliminary Report on Patentability for PCT/JP2010/068450, mail date is May 24, 2012.
Office Action, CN Application No. 201080042569.4, issued Feb. 18, 2013, along with corresponding English Language translation.
Japanese Office Action issued with respect to Japanese Application No. 2009-241717 with English translation thereof, mail date is Dec. 19, 2013.
Extended European Search Report for EP Patent Application No. 10824960.8, which is dated Dec. 18, 2014.

* cited by examiner

PRESSURE-SENSITIVE ADHESIVE SHEET FOR SURFACE PROTECTION

TECHNICAL FIELD

The invention relates to a surface-protecting pressure-sensitive adhesive sheet.

BACKGROUND ART

In recent years, the use of plant-derived raw materials, which are renewable materials, has been recommended as a measure to prevent depletion of fossil resources or global warming.

There has also been a concern about the increase in carbon dioxide due to combustion of fossil resources, which is a cause of global warming, and alternative use of plant-derived materials, which are so-called carbon neutral, has been promoted as a measure against that.

Under the circumstances, various surface-protecting pressure-sensitive adhesive sheets have been developed for protecting the surfaces of stainless steel products, glass plates, car bodies, etc., and particularly in recent years, pressure-sensitive adhesive sheets have been used for surface protection in image display devices such as liquid crystal panels, plasma displays, and EL displays. Pressure-sensitive adhesive sheet are also being frequently used to protect optical components, such as lens sheets and prism sheets, for use in these devices. Surface-protecting pressure-sensitive adhesive sheets are used during the process of manufacturing a lot of these optical components or during transportation or transfer after the manufacture thereof, and then incinerated. Therefore, they are a cause of carbon dioxide emissions and pose a challenge.

Synthetic rubbers and acryl-based pressure-sensitive adhesives have been used as adhesive materials for the surface-protecting pressure-sensitive adhesive sheets. Unfortunately, at present, no available plant-derived acryl-based pressure-sensitive adhesive has been found.

Besides the pressure-sensitive adhesives mentioned above, there is disclosed a polyester-based pressure-sensitive adhesive, part of which is produced using a plant-derived raw material (Patent Documents 1 to 3).

Patent Document 1 is related to a polyester-based pressure-sensitive adhesive having heat resistance, in which 50 to 90% by weight of an aromatic dicarboxylic acid is added as a main raw material. Unfortunately, the aromatic dicarboxylic acid includes no plant-derived material, and the document does not have any specific description about the hydroxyl value and so on with respect to the raw materials for the pressure-sensitive adhesive composition or about a crosslinking agent for use in forming the pressure-sensitive adhesive layer. The document is also not related to a surface-protecting pressure-sensitive adhesive composition or a surface-protecting pressure-sensitive adhesive sheet.

Patent Document 2 mentioned above discloses a biodegradable pressure-sensitive adhesive tape for use in agricultural applications. Unfortunately, none of all the raw material components of the pressure-sensitive adhesive used in the pressure-sensitive adhesive tape is derived from plants. The document is also not related to a surface-protecting pressure-sensitive adhesive composition or a surface-protecting pressure-sensitive adhesive sheet, and even if the tape is used for surface protection, good properties cannot be obtained.

In Patent Document 3 mentioned above, there are approaches to use polyester including polylactic acid as a plant-derived raw material to form a pressure-sensitive adhesive. This document discloses a biodegradable pressure-sensitive adhesive containing, as essential components, (A) an aliphatic polyester containing 55% by weight or more of a lactic acid residue and having a molar ratio (L/D) of L-lactic acid to D-lactic acid of 0.11 to 9 and a reduced viscosity in the range of 0.2 to 1.0 dl/g and (B) a natural product-based tackifying resin. Unfortunately, the adhesive strength of the pressure-sensitive adhesive disclosed in Patent Document 3, which is produced using polylactic acid-based polyester, is not sufficiently prevented from increasing, so that it has the problem of staining of the adherend.

Even if a large amount of a crosslinking agent is added, the gel fraction of conventional pressure-sensitive adhesives produced using polyester as a plant-derived raw material does not sufficiently increase, namely, the adhesive strength does not decrease, so that surface-protecting pressure-sensitive adhesive sheets produced therewith cannot be peeled off after use, and an adhesive deposit is formed on the adherend to cause a problem such as staining of the adherend.

PRIOR ART DOCUMENTS

Patent Documents

Patent Document 1: Japanese Patent Application Laid-Open (JP-A) No. 04-328186
Patent Document 2: JP-A No. 10-237401
Patent Document 3: JP-A No. 2004-231797

SUMMARY OF THE INVENTION

Problems to be Solved by the Invention

Thus, an object of the invention is to provide a surface-protecting pressure-sensitive adhesive sheet that is produced using a plant-derived raw material, is global environmentally-friendly, and has good adhesive properties and high resistance to staining.

Means for Solving the Problems

As a result of earnest studies to solve the problems, the inventors have found the surface-protecting pressure-sensitive adhesive sheet described below and completed the invention.

Specifically, the invention is directed to a surface-protecting pressure-sensitive adhesive sheet, including: a substrate; and a pressure-sensitive adhesive layer that is provided on at least one side of the substrate and made from a polyester-based pressure-sensitive adhesive composition including a crosslinking agent and a polyester including at least a lactic acid unit, a dibasic acid unit, and a glycol unit, wherein the dibasic acid unit includes a dimer acid, the polyester has a weight average molecular weight of 20,000 to 200,000 and a glass transition temperature of −70 to −20° C. as measured using a differential scanning calorimeter at a temperature rise rate of 20° C./minute, the polyester-based pressure-sensitive adhesive composition has a hydroxyl value of 20 to 60 mgKOH/g, and the pressure-sensitive adhesive layer has a gel fraction of 85 to 99% by weight.

In the surface-protecting pressure-sensitive adhesive sheet of the invention, the polyester preferably contains 10 to 50% by mole of the lactic acid unit and 50 to 90% by mole of the other components than the lactic acid unit, and the molar ratio of the dibasic acid unit to the glycol unit is preferably 1:0.8 to 1:1.2.

In the surface-protecting pressure-sensitive adhesive sheet of the invention, the dibasic acid unit preferably further includes an aliphatic dibasic acid other than the dimer acid.

In the surface-protecting pressure-sensitive adhesive sheet of the invention, the polyester preferably contains a tri- or polyfunctional carboxylic acid and/or polyol component as a component other than the lactic acid unit, the dibasic acid unit, and the glycol unit, and the polyester preferably has a dispersity (Mw/Mn) of 2.5 to 10.0.

In the surface-protecting pressure-sensitive adhesive sheet of the invention, the polyester preferably has a hydroxyl value of 2 to 50 mgKOH/g.

In the surface-protecting pressure-sensitive adhesive sheet of the invention, the polyester-based pressure-sensitive adhesive composition preferably further contains a branched polyester oligomer with a hydroxyl value of 100 to 1,000 mgKOH/g, and the composition preferably includes 50 to 99 parts by weight of the polyester and 1 to 50 parts by weight of the branched polyester oligomer.

In the surface-protecting pressure-sensitive adhesive sheet of the invention, the crosslinking agent is preferably a polyvalent isocyanurate.

In the surface-protecting pressure-sensitive adhesive sheet of the invention, the pressure-sensitive adhesive layer preferably has a storage modulus of $1\times10^4$ to $1\times10^7$ Pa as measured using a dynamic viscoelasticity meter under the conditions of 23° C. and a frequency of 1 Hz.

The surface-protecting pressure-sensitive adhesive sheet of the invention preferably has an initial adhesive strength of 0.1 to 0.5 N/20 mm at 23° C., a peel angle of 180° with respect to an acrylic plate, and a rate of pulling of 300 mm/minute, and preferably has an adhesive strength of 0.1 to 1.0 N/20 mm after storage at 40° C. for 30 days.

In the surface-protecting pressure-sensitive adhesive sheet of the invention, the substrate is preferably biodegradable.

Effects of the Invention

According to the invention, a polyester produced with plant-derived raw materials including lactic acid and a dibasic acid is used to form a polyester-based pressure-sensitive adhesive composition, and a pressure-sensitive adhesive sheet having a pressure-sensitive adhesive layer formed using the composition is used in surface protection applications. Therefore, the surface-protecting pressure-sensitive adhesive sheet can contribute to the suppression of the increase in carbon dioxide even when peeled off and incinerated after the use of the surface-protecting pressure-sensitive adhesive sheet, and according to the invention, global environmentally-friendly surface-protecting pressure-sensitive adhesive sheets with good adhesive properties and high resistance to staining can be advantageously obtained.

EMBODIMENTS FOR CARRYING OUT THE INVENTION

The polyester for use in the surface-protecting pressure-sensitive adhesive sheet of the invention contains at least a lactic acid unit, a dibasic acid unit, and a glycol unit. The method for synthesizing the polyester is not restricted, and it can be synthesized using a known polymerization method.

Examples of the lactic acid unit include, but are not limited to, L-lactide, D-lactide, DL-lactide, meso-lactide, L-lactic acid, D-lactic acid, and DL-lactic acid. Among them, DL-lactide is preferred in view of polymerization reaction efficiency and solubility in solvents. The polyester with the desired properties can be obtained by copolymerization with any of these lactic acid units. One of these lactic acid units may be used, or two or more of these lactic acid units may be used in combination.

The content of the lactic acid unit in the polyester components is preferably from 10 to 50% by mole, more preferably from 15 to 45% by mole. If it is less than 10% by mole, the pressure-sensitive adhesive layer produced using the polyester may have reduced elastic modulus, so that the adhesive properties of the pressure-sensitive adhesive may vary with time. If it is more than 50% by mole, the polyester may have a high glass transition temperature (Tg), which is not preferred because it may cause degradation of adhesive properties.

On the other hand, the content of the components other than the lactic acid unit in the polyester components is preferably from 50 to 90% by mole, more preferably from 55 to 85% by mole. If it is less than 50% by mole, the pressure-sensitive adhesive produced using the polyester may have low adhesive properties, and if it is more than 90% by mole, the pressure-sensitive adhesive produced using the polyester may have reduced cohesive strength, which is not preferred because the adhering strength (adhesive strength) to the adherend (such as a backing or substrate) may decrease.

The dibasic acid unit includes a dimer acid. A hydrogenated dimer acid may also be used to form the dimer acid unit. The polyester with good adhesive properties can be obtained by copolymerization with any of these dibasic acid units. One of these dibasic acid units may be used, or two or more of these dibasic acid units may be used in combination.

In the polyester, the dibasic acid unit preferably further includes an aliphatic dibasic acid other than the dimer acid. When an aliphatic dibasic acid other than the dimer acid is subjected to the copolymerization, it can increase the compatibility between the dimer acid and lactic acid, so that they are expected to have increased solubility in solvents.

The aliphatic dibasic acid is typically, but not limited to, a polycarboxylic acid, an alkyl ester thereof, or an acid anhydride thereof.

Examples of the polycarboxylic acid include aliphatic and alicyclic dicarboxylic acids such as adipic acid, azelaic acid, sebacic acid, 1,4-cyclohexanedicarboxylic acid, 4-methyl-1,2-cyclohexanedicarboxylic acid, dodecenyl succinic anhydride, fumaric acid, succinic acid, dodecanedicarboxylic acid, hexahydrophthalic anhydride, tetrahydrophthalic anhydride, maleic acid, maleic anhydride, itaconic acid, and citraconic acid. In particular, sebacic acid, which can be obtained from plants, is preferred. One of these acids may be used, or two or more these acids may be used in combination.

An aromatic dibasic acid may also be used to such an extent that it does not degrade the properties of the polyester for use in the surface-protecting pressure-sensitive adhesive sheet of the invention. Examples of the aromatic dibasic acid include, but are not limited to, terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyletherdicarboxylic acid. One of these acids may be used, or two or more of these acids may be used in combination.

For example, the glycol unit to be used may be, but not limited to, an aliphatic glycol. The use of an aliphatic glycol makes it possible to increase the molecular weight of the polyester and to improve the adhesive properties and durability of the pressure-sensitive adhesive produced with the polyester.

Examples of the aliphatic glycol include ethylene glycol, 1,2-propylene glycol, 1,3-propanediol, 2-methyl-1,3-propanediol, 1,2-butanediol, 1,3-butanediol, 1,4-butanediol, 1,5- pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol. In particular, 1,3-propanediol, which can be obtained from plants, is preferred. One of these glycols may be used, or two or more of these glycols may be used in combination.

Any other glycol unit than the aliphatic glycol may be used in combination with the aliphatic glycol to such an extent that it does not degrade the properties of the polyester for use in the surface-protecting pressure-sensitive adhesive sheet of the invention. Examples of such a glycol include an ethylene oxide adduct and a propylene oxide adduct of bisphenol A, an ethylene oxide adduct and a propylene oxide adduct of hydrogenated bisphenol A, polytetramethylene glycol, polypropylene glycol, polyethylene glycol, polycarbonate glycol, etc. One of these glycols may be used, or two or more of these glycols may be used in combination.

The molar ratio of the dibasic acid unit to the glycol unit is preferably 1:0.8 to 1:1.2, more preferably 1:0.9 to 1:1.1. If the molar ratio is less than 1:0.8 (the content of the glycol unit is lower), a higher acid value or a lower molecular weight may be obtained, and if it is higher than 1:1.2 (the content of the glycol unit is higher), a lower molecular weight may be obtained, or the adhesive properties may tend to decrease, which is not preferred.

Examples of the tri- or polyfunctional carboxylic acid include, but are not limited to, trimellitic acid, pyromellitic acid, benzophenonetetracarboxylic acid, biphenyltetracarboxylic acid, ethylene glycol bis(anhydrotrimellitate), and glycerol tris(anhydrotrimellitate).

Examples of the tri- or polyfunctional polyol include glycerin, trimethylolpropane, pentaerythritol, and polyglycerin.

In view of reactivity, the content of the tri- or polyfunctional carboxylic acid and/or polyol in the components of the polyester is preferably from 0.01 to 10% by mole, more preferably from 0.1 to 5% by mole.

As far as the properties of the polyester for use in the surface-protecting pressure-sensitive adhesive sheet of the invention are not degraded, glycolic acid or a lactone may also be copolymerized (used), or glycolic acid or a lactone may be added and polymerized after the polymerization of other components to modify the end of the molecule. An acid anhydride may also be added and polymerized after the polymerization of other components to convert the end of the molecule to a carboxyl group. One of these may be used, or two or more of these may be used in combination.

The polyester preferably further contains the tri- or polyfunctional carboxylic acid and/or polyol component as a component other than the lactic acid unit, the dibasic acid unit, and the glycol unit, and the polyester preferably has a dispersity (Mw/Mn) of 2.5 to 10.0, more preferably 2.5 to 9.5. When the dispersity is in the above range, the adhesive strength can be effectively increased, and the pressure-sensitive adhesive can be effectively prevented from being transferred to the adherend. When the tri- or polyfunctional carboxylic acid and/or polyol is added, the molecular weight of the polyester for use in the invention can be further increased, so that the adhesive produced using the polyester can have good adhesive properties. In the description, Mw represents weight average molecular weight, and Mn represents number average molecular weight.

The polyester has a glass transition temperature (Tg) of −70 to −20° C., preferably −60 to −40° C. as measured using a differential scanning calorimeter at a temperature rise rate of 20° C./minute. If the Tg is lower than −70° C., the holding power may decrease, and if the Tg is higher than −20° C., the pressure-sensitive adhesive produced using the polyester may have degraded adhesive properties at room temperature, which is not preferred.

The polyester has a weight average molecular weight of 20,000 to 200,000, preferably 50,000 to 150,000. A weight average molecular weight of less than 20,000 may cause a reduction in the adhesive strength of the pressure-sensitive adhesive produced using the polyester. A weight average molecular weight of more than 200,000 is also not preferred, because it may cause a reduction in cohesive strength or in holding power.

The polyester has a hydroxyl value of 2 to 50 mgKOH/g, preferably 6 to 40 mgKOH/g, in particular, preferably 10 to 30 mgKOH/g. If the hydroxyl value is less than 2 mgKOH/g, the polyester will have low reactivity with a crosslinking agent, which will be a cause of a reduction in the cohesive strength of the pressure-sensitive adhesive produced using the polyester. A hydroxyl value of more than 50 mgKOH/g may cause a reduction in water resistance and therefore is not preferred.

The polyester preferably has an acid value of 5 mgKOH/g or less, more preferably 0.1 to 3 mgKOH/g. An acid value of more than 5 mgKOH/g may cause acceleration of hydrolysis and a reduction in durability, and therefore is not preferred.

The polyester-based pressure-sensitive adhesive composition for use in the surface-protecting pressure-sensitive adhesive sheet of the invention is preferably a polyester composition containing 50 to 99 parts by weight of the polyester (polyester (i)) and 1 to 50 parts by weight of a branched polyester oligomer (ii) with a hydroxyl value of 100 to 1,000 mgKOH/g, more preferably a polyester composition containing 90 to 99 parts by weight of the polyester (i) and 1 to 10 parts by weight of a branched polyester oligomer (ii) with a hydroxyl value of 100 to 800 mgKOH/g, particularly when it should have an adhesive strength of 0.1 to 0.5 N/20 mm after storage at 40° C. for 30 days. The addition of the branched polyester oligomer (ii) is effective in accelerating curing (crosslinking) and in reducing staining of the adherend after re-peeling when the composition is used to form the pressure-sensitive adhesive (layer). If the hydroxyl value is less than 100 mgKOH/g, the curing-accelerating effect may be insufficient, and a hydroxyl value of more than 1,000 mgKOH/g may cause a reduction in solubility in general-purpose organic solvents, and therefore is not preferred. If the added amount of the branched polyester oligomer (ii) is less than 1 part by weight, the curing-accelerating effect may be insufficient, and an added amount of more than 50 parts by weight may cause degradation of the adhesive properties, and therefore is not preferred. As used herein, the term "polyester composition" is intended to include a polyester or a mixture of a polyester and a branched polyester oligomer, and the term "polyester-based pressure-sensitive adhesive composition" is intended to include a mixture containing the polyester composition and an additive such as a crosslinking agent.

The branched polyester oligomer (ii) has a branched structure and good solubility in organic solvents, and is relatively cheap from an economic point of view.

The branched polyester oligomer (ii) preferably has a number average molecular weight of 1,000 to 8,000, more preferably 1,000 to 6,000. A number average molecular weight of less than 1,000 may be a cause of staining of the adherend, and a number average molecular weight of more than 8,000 may cause a reduction in reactivity with a crosslinking agent, and therefore is not preferred.

For example, the structure of the branched polyester oligomer (ii) is preferably, but not limited to, a structure having a main skeleton obtained by polycondensation or polyaddition reaction of ABx compound. As used herein, the term "ABx compound" means a compound having different functional groups A and B (organic groups). The ABx compound is also a compound having a functional group that does not cause intramolecular condensation or intramolecular addition reaction but can cause intermolecular condensation or intermolecular addition reaction. In particular, the main skeleton preferably has an ester bond. In the different functional groups, for example, the functional group A is a carboxyl group or a derivative thereof, and the functional group B is a hydroxyl group or a derivative thereof, and the ABx compound is a compound having these groups.

Examples of the ABx compound include 2,2-dimethylolpropionic acid, 2,2-dimethylolbutanoic acid, 5-(2-hydroxyethoxy)isophthalic acid, 5-acetoxyisophthalic acid, 3,5-bis(2-hydroxyethoxy)benzoic acid, 3,5-bis(2-hydroxyethoxy) benzoic acid methyl ester, 4,4-(4'-hydroxyphenyl)pentanoic acid, 5-hydroxycyclohexane-1,3-dicarboxylic acid, 1,3-dihydroxy-5-carboxycyclohexane, 5-(2-hydroxyethoxy)cyclohexane-1,3-dicarboxylic acid, and 1,3-(2-hydroxyethoxy)-5-carboxycyclohexane. In particular, 2,2-dimethylolpropionic acid or 2,2-dimethylolbutanoic acid is preferred in view of versatility of raw material compounds and ease of polymerization reaction process.

The branched polyester oligomer (ii) is also effective, because it has an ester bond and therefore has good compatibility with the polyester (i) so that the product (crosslinked product) of the reaction between them tends to have higher transparency. In particular, a branched polyester oligomer (ii) of an aliphatic monomer tends to have higher compatibility, and therefore is preferred.

The branched polyester oligomer (ii) can be produced by a method including allowing the ABx compound alone to react in the presence of a condensation reaction catalyst to synthesize the oligomer. In addition, a polyol group-containing compound, a polycarboxylic acid, or a compound having both a hydroxyl group and a carboxyl group may be used to form the branched point of the branched polyester oligomer (ii).

Examples of the polyol group-containing compound include various general-purpose glycol compounds and tri- or polyfunctional hydroxyl group-containing compounds such as trimethylolpropane, pentaerythritol, and dipentaerythritol.

Examples of the polycarboxylic acid include various general-purpose dibasic acids and tri- or polyfunctional carboxylic acid compounds such as trimellitic acid, pyromellitic acid, and benzophenonetetracarboxylic acid.

In addition, examples of the compound having both a hydroxyl group and a carboxyl group include glycolic acid, hydroxypivalic acid, 3-hydroxy-2-methylpropionic acid, lactic acid, glyceric acid, malic acid, and citric acid.

Besides the polyol group-containing compound, the polycarboxylic acid, or the compound having both a hydroxyl group and a carboxyl group, a straight-chain (linear) polyester oligomer obtained by condensation reaction of a dibasic acid with a glycol compound, or a specific functional group-containing branched polyester oligomer (iii) obtained by copolymerization of a dibasic acid, a glycol compound, and a tri- or polyfunctional polyol group-containing compound or a polycarboxylic acid may also be used to form the branched point of the branched polyester oligomer (ii).

Any of various general-purpose dibasic acids, a glycol compound, a tri- or polyfunctional polycarboxylic acid, and a polyhydric alcohol compound may be used as a raw material for the straight-chain (linear) polyester oligomer or the specific functional group-containing branched polyester oligomer (iii) capable of forming the branched point.

Examples of the dibasic acid include aliphatic dibasic acids such as succinic acid, adipic acid, azelaic acid, sebacic acid, and dodecanoic acid; aromatic dibasic acids such as terephthalic acid, isophthalic acid, orthophthalic acid, 1,2-naphthalenedicarboxylic acid, and 1,6-naphthalenedicarboxylic acid; and alicyclic dibasic acids such as 1,2-cyclohexanedicarboxylic acid, 1,4-cyclohexanedicarboxylic acid, and 4-methyl-1,2-cyclohexanedicarboxylic acid. Among them, particularly in view of heat resistance, terephthalic acid, isophthalic acid, orthophthalic acid, 1,2-naphthalenedicarboxylic acid, and 1,6-naphthalenedicarboxylic acid are preferred, and terephthalic acid, 1,2-naphthalenedicarboxylic acid, and 1,6-naphthalenedicarboxylic acid are particularly preferred.

Examples of the glycol compound include aliphatic diols such as ethylene glycol, 1,2-propylene glycol, 1,3-propylene glycol, 1,2-butylene glycol, 1,3-butylene glycol, 2,3-butylene glycol, 1,4-butylene glycol, 2-methyl-1,3-propylene glycol, neopentyl glycol, 3-methyl-1,5-pentadiol, 2,2,4-trimethyl-1,3-pentanediol, 2,4-diethyl-1,5-pentanediol, 2-ethyl-1,3-hexanediol, 2,2-dimethyl-3-hydroxypropyl-2',2'-dimethyl-3-hydroxypropanate, 2-n-butyl-2-ethyl-1,3-propanediol, 3-ethyl-1,5-pentanediol, 3-propyl-1,5-pentanediol, 2,2-diethyl-1,3-propanediol, and 3-octyl-1,5-pentanediol; alicyclic glycols such as 1,3-bis(hydroxymethyl)cyclohexane, 1,4-bis(hydroxymethyl)cyclohexane, 1,4-bis(hydroxyethyl)cyclohexane, 1,4-bis(hydroxypropyl)cyclohexane, 1,4-bis(hydroxymethoxy)cyclohexane, 1,4-bis(hydroxyethoxy)cyclohexane, 2,2-bis(4-hydroxymethoxycyclohexyl)propane, 2,2-bis(4-hydroxyethoxycyclohexyl)propane, bis(4-hydroxycyclohexyl)methane, 2,2-bis(4-hydroxycyclohexyl) propane, and $3(4),8(9)$-tricyclo$[5.2.1.\,O^{2,6}]$ decanedimethanol; and aromatic glycols such as ethylene oxide or propylene oxide adducts of bisphenol A or the like.

In addition, examples of the tri- or polyfunctional polycarboxylic acid and the polyol group-containing compound include trimellitic acid, pyromellitic acid, benzophenonetetracarboxylic acid, glycerin, trimethylolpropane, and pentaerythritol.

Examples of the method for removing water produced by the polymerization (condensation) reaction include a method of removing water by azeotrope with toluene or xylene, a method including blowing inert gas into the reaction system so that the produced water and monoalcohol can be discharged together with the inert gas to the outside of the reaction system, and a method of distillation under reduced pressure.

The polymerization catalyst used in the polymerization (condensation) reaction may be one commonly used in the production of polyesters, and examples of such a catalyst include, but are not limited to, various metal compounds such as titanium-based, tin-based, antimony-based, zinc-based, and germanium-based compounds; and strong acid compounds such as p-toluenesulfonic acid and sulfuric acid.

In order to increase the compatibility with the polyester, it is more preferred to introduce a long-chain hydrocarbon group of 6 or more carbon atoms into the end group of the branched polyester oligomer. For example, a hydrocarbon group of 6 or more carbon atoms may be introduced by a method of performing addition reaction or condensation reaction of a compound having a hydrocarbon group of 6 or more carbon atoms with the terminal carboxyl or hydroxyl group of the branched polyester oligomer prepared previously. Examples of such a compound include a monoalcohol having a long-chain alkyl group, such as hexanol, octanol, decyl alcohol, undecyl alcohol, or dodecyl alcohol; and a monocarboxylic acid having a long-chain alkyl or alkenyl group, such as octanoic acid, decanoic acid, dodecanoic acid, myristic acid, palmitic acid, stearic acid, or oleic acid having an unsaturated group, or a methyl ester derivative thereof.

There are also a method of performing ring-opening addition of a carboxylic anhydride compound having a hydrocarbon group of 6 or more carbon atoms to the terminal hydroxyl group in the presence of a basic catalyst; and a method of performing addition reaction of a compound having a glycidyl group and a hydrocarbon group of 6 or more carbon atoms with the terminal carboxyl group in the presence of an appropriate catalyst such as triphenylphosphine. The compound having a hydrocarbon group may be an acid anhydride compound, examples of which include dodecenylsuccinic anhydride and octadecylsuccinic anhydride. Examples of the compound having a glycidyl group include various aryl glycidyl ethers such as phenyl glycidyl ether; polyethylene glycol monoglycidyl ether, polypropylene glycol monoglycidyl ether, and polytetramethylene glycol monoglycidyl ether; and monoglycidyl ethers such as alkyl, alkenyl, and alkynyl glycidyl ethers.

The polyester composition preferably has a total hydroxyl value of 20 to 60 mgKOH/g, more preferably 30 to 50 mgKOH/g. If the total hydroxyl value is less than 20 mgKOH/g, the curing accelerating effect may be insufficient, and a total hydroxyl value of more than 60 mgKOH/g may reduce the adhesive properties and therefore is not preferred.

The polyester composition (when the polyester is used alone with no branched polyester oligomer or when a mixture of the polyester and the branched polyester oligomer is used) preferably has a total acid value of 5 mgKOH/g or less, more preferably 0.1 to 3 mgKOH/g. An acid value of more than 5 mgKOH/g may cause acceleration of hydrolysis and a reduction in durability, and therefore is not preferred.

The whole of the polyester composition preferably has a weight average molecular weight (Mw) of 10,000 to 200,000, more preferably 50,000 to 150,000. A weight average molecular weight of less than 10,000 may cause a reduction in the adhesive strength of the pressure-sensitive adhesive produced using the polyester composition. A weight average molecular weight of more than 200,000 is also not preferred, because it may cause a reduction in cohesive strength or in holding power.

In a preferred mode, the polyester-based pressure-sensitive adhesive composition is produced using a plant-derived raw material. This is because the plant-derived raw material, which is biodegradable and said to be so-called carbon neutral, can form a global environmentally-friendly or environmentally-sound, pressure-sensitive adhesive. The composition preferably has a biomass degree of 70% or more, more preferably 80% or more, which is a measure of how much plant-derived material the composition contains. As used herein, the term "biomass degree (%)" means the plant-derived material content, which is the calculated ratio of the weight of the plant-derived raw material(s) used to the total weight of the raw materials used to form the polyester-based pressure-sensitive adhesive composition. Examples of the plant-derived raw material include a dimer acid, sebacic acid or the like for the dibasic acid component, lactic acid for the lactic acid component, and 1,3-propylene glycol for the glycol (diol) component.

The polyester-based pressure-sensitive adhesive composition for use in the surface-protecting pressure-sensitive adhesive sheet of the invention contains a crosslinking agent. A pressure-sensitive adhesive layer can be formed by subjecting the crosslinking agent-containing pressure-sensitive adhesive composition to a crosslinking reaction. The crosslinking agent to be used is not restricted and may be any conventionally known one such as a polyvalent isocyanurate, a polyfunctional isocyanate, a polyfunctional melamine compound, a polyfunctional epoxy compound, a polyfunctional oxazoline compound, a polyfunctional aziridine compound, or a metal chelate compound. In a preferred mode, a polyvalent isocyanurate or a polyfunctional isocyanate compound is used, particularly in view of the transparency of the resulting pressure-sensitive adhesive layer or the achievement of high gel fraction.

For example, the polyvalent isocyanurate may be a polyisocyanurate of hexamethylene diisocyanate. The use of such a compound makes it possible to achieve the object of obtaining a pressure-sensitive adhesive layer with transparency and high gel fraction, and therefore is advantageous. Commercially available products of the polyvalent isocyanurate may also be used, examples of which include DURANATE TPA-100 (trade name, manufactured by Asahi Kasei Chemicals Corporation) and CORONATE HK, CORONATE HX, and CORONATE 2096 (trade names, manufactured by Nippon Polyurethane Industry Co., Ltd.). One of these may be used, or two or more of these may be used in combination.

The polyfunctional isocyanate compound is preferably, but not limited to, a compound having at least two isocyanate groups, more preferably three or more isocyanate groups in the molecule (when the composition contains the branched polyester oligomer (ii), it may have two or more isocyanate groups), examples of which include aliphatic polyisocyanates, alicyclic polyisocyanates, and aromatic polyisocyanates. One of these may be used, or two or more of these may be used in combination.

Examples of the aliphatic polyisocyanates include 1,2-ethylene diisocyanate, tetramethylene diisocyanates such as 1,2-tetramethylene diisocyanate, 1,3-tetramethylene diisocyanate, and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, and 2,5-hexamethylene diisocyanate; and 2-methyl-1,5-pentane diisocyanate, 3-methyl-1,5-pentane diisocyanate, and lysine diisocyanate.

Examples of the alicyclic polyisocyanates include isophorone diisocyanate; cyclohexyl diisocyanates such as 1,2-cyclohexyl diisocyanate, 1,3-cyclohexyl diisocyanate, and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

The polyfunctional isocyanate compound may also be a dimer or trimer of any of the aliphatic polyisocyanates, alicyclic polyisocyanates, aromatic polyisocyanates, and aromatic aliphatic polyisocyanates, and specifically, the polyfunctional isocyanate compound may be a dimer or trimer of diphenylmethane diisocyanate, a reaction product of trimethylolpropane and tolylene diisocyanate, a reaction product of trimethylolpropane and hexamethylene diisocyanate, or a polymer such as polymethylene polyphenylisocyanate, polyether polyisocyanate, or polyester polyisocyanate.

Commercially available products of the polyfunctional isocyanate compound may also be used, examples of which include CORONATE L (trade name, manufactured by Nippon Polyurethane Industry Co., Ltd.) as a trimer adduct of trimethylolpropane and tolylene diisocyanate, and CORONATE HL (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidyl aniline and glycerin diglycidyl ether. One of these may be used, or two or more of these may be used in combination.

While the type or added amount of the crosslinking agent is not restricted, the crosslinking agent should be added so that a pressure-sensitive adhesive layer with a gel fraction of 85 to 99% by weight, preferably 87 to 99% by weight can be formed in a pressure-sensitive adhesive sheet for surface protection applications. If the gel fraction is less than 85% by weight, the peel force may increase with time, or the adherend may be stained in the process of peeling off the pressure-sensitive adhesive layer (pressure-sensitive adhesive sheet). A gel fraction of more than 99% by weight is not preferred, because at such a gel fraction, the adhesive strength may be low, so that it may be impossible to fix the pressure-sensitive adhesive sheet itself on the adherend.

The added amount of the crosslinking agent is preferably from 0.001 to 20 parts by weight, more preferably from 0.001 to 10 parts by weight, based on 100 parts by weight of the polyester composition (the polyester or a mixture of the polyester and the branched polyester oligomer). If the added amount is less than 0.001 parts by weight, the process of forming the pressure-sensitive adhesive layer may fail to increase cohesive strength. An added amount of more than 20 parts by weight is not preferred, because with such an amount, the resulting pressure-sensitive adhesive layer may fail to have sufficient adhesive strength and may have reduced adhesive strength.

A catalyst may also be used as appropriate to efficiently control the gel fraction of the pressure-sensitive adhesive layer for use in the surface-protecting pressure-sensitive adhesive sheet of the invention. Examples of the catalyst include tetra-n-butyl titanate, tetraisopropyl titanate, butyltin oxide, and dioctyltin dilaurate.

The added amount of the catalyst is preferably, but not limited to, 0.01 to 1 part by weight, more preferably 0.05 to 0.5 parts by weight, based on 100 parts by weight of the polyester composition (the polyester or a mixture of the polyester and the branched polyester oligomer). If the added amount is less than 0.01 parts by weight, the added catalyst may fail to be effective, and an added amount of more than 1 part by weight is not preferred, because such an amount may significantly reduce shelf life and coating stability.

The polyester-based pressure-sensitive adhesive composition for forming the pressure-sensitive adhesive layer for use in the invention may also contain a combination of the crosslinking agent and a tackifying resin, which makes it possible to obtain a pressure-sensitive adhesive layer having the desired properties.

The tackifying resin is not restricted and may be any conventionally known one, examples of which include a terpene-based tackifying resin, a phenol-based tackifying resin, a rosin-based tackifying resin, an aliphatic petroleum resin, an aromatic petroleum resin, a copolymer-based petroleum resin, an alicyclic petroleum resin, a xylene resin, an epoxy-based tackifying resin, a polyamide-based tackifying resin, a ketone-based tackifying resin, and an elastomer-based tackifying resin. In particular, a rosin- or terpene-based tackifying resin produced from a plant-derived raw material is preferably used so that the biomass degree can be increased. One of these may be used, or two or more of these may be used in combination.

Examples of the terpene-based tackifying resin include a terpene resin, a terpene phenol resin, and an aromatic modified terpene resin, and specific examples that may be used include an α-pinene polymer, a β-pinene polymer, a dipentene polymer, and modifications thereof, such as a phenol-modified terpene-based resin, an aromatic modified terpene-based resin, a hydrogenated modified terpene-based resin, and a hydrocarbon-modified terpene-based resin.

Examples of the phenol-based tackifying resin that may be used include condensation products of formaldehyde and any of various phenols such as phenol, m-cresol, 3,5-xylenol, p-alkylphenol, and resorcin. Further examples that may be used include resols obtained by addition reaction of formaldehyde and any of the phenols in the presence of an alkali catalyst; novolac resins obtained by condensation reaction of formaldehyde and any of the phenols in the presence of an acid catalyst; and rosin-modified phenolic resins obtained by addition reaction of phenol with any of rosins such as unmodified or modified rosin and derivatives thereof and thermal polymerization of the addition product.

Examples of the rosin-based tackifying resin include a rosin resin, a polymerized rosin resin, a hydrogenated rosin resin, a rosin ester resin, a hydrogenated rosin ester resin, and a rosin phenol resin. Specific examples that may be used include unmodified rosin (raw rosin) such as gum rosin, wood rosin, or tall oil rosin, modified rosin obtained by hydrogenation, disproportionation, polymerization, or any other chemical modification thereof, and derivatives thereof.

The added amount of the tackifying resin is preferably from 0 to 50 parts by weight, more preferably from 2 to 30 parts by weight, in particular, preferably from 5 to 20 parts by weight, based on 100 parts by weight of the polyester composition (the polyester or a mixture of the polyester and the branched polyester oligomer). An added amount of more than 50 parts by weight is not preferred, because such an amount may cause an increase in adhesive strength, so that re-peeling may become difficult after exposure to a high-temperature environment.

As far as the properties of the pressure-sensitive adhesive layer (pressure-sensitive adhesive) for use in the surface-protecting pressure-sensitive adhesive sheet of the invention are not degraded, any of common additives may also be used, such as ultraviolet absorbers, photostabilizers, peeling regulators, plasticizers, softening agents, fillers, colorants such as pigments and dyes, antioxidants, and surfactants.

The pressure-sensitive adhesive layer is made from the polyester-based pressure-sensitive adhesive composition. The use of the polyester-based pressure-sensitive adhesive composition makes it possible to obtain a global environmentally-friendly pressure-sensitive adhesive layer with good adhesive properties.

The pressure-sensitive adhesive layer preferably has a storage modulus of $1 \times 10^4$ to $1 \times 10^7$ Pa, more preferably $1 \times 10^5$ to $1 \times 10^6$ Pa, as measured using a dynamic viscoelasticity meter under the conditions of 23° C. and a frequency of 1 Hz. A storage modulus of less than $1\times10^4$ Pa may cause the problem of a reduction in the cohesive strength and holding power of the pressure-sensitive adhesive layer. On the other hand, a storage modulus of more than $1\times10^7$ Pa is not preferred, because such a storage modulus may cause the problem of hardening of the pressure-sensitive adhesive layer and a reduction in pressure-sensitive adhesive strength.

For example, the thickness of the pressure-sensitive adhesive layer, which may be arbitrarily selected, is preferably from about 3 to about 20 µm, more preferably from about 5 to about 10 µm. If the thickness of the pressure-sensitive adhesive layer is less than 3 µm, sufficient adhesive strength may be difficult to obtain, so that peeling may easily occur. A thickness of more than 20 µm is not preferred, because with such a thickness, the adhesive strength may increase with time, which may make peeling difficult. The pressure-sensitive adhesive layer may be in the form of any of a single layer and a laminate.

The surface-protecting pressure-sensitive adhesive sheet of the invention is obtained by forming the pressure-sensitive adhesive layer on at least one side of a substrate. As far as the characteristics of the surface-protecting pressure-sensitive adhesive sheet of the invention are not degraded, an intermediate layer or an undercoat layer may also be provided.

The substrate to be used is not restricted and may be any conventionally known one, and any of various substrates (backings) may be used, such as plastic films and porous materials such as paper sheets and unwoven fabrics. For surface protection applications, plastic films are preferably used in view of durability or the like. Examples of the plastic films include polyolefin films such as polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, and ethylene-vinyl alcohol copolymer films; polyester films such as polyethylene terephthalate, polyethylene naphthalate, and polybutylene terephthalate films; polyacrylate films; polystyrene films; polyamide films such as nylon 6, nylon 6,6, and partially aromatic polyamide films; and polyvinyl chloride films; polyvinylidene chloride films; and polycarbonate films. Substrates comprising polylactic acid or cellulose, which is obtained from plant-derived raw materials, are advantageously used.

If necessary, the substrate may contain any of various additives commonly used in backings (substrates) for pressure-sensitive adhesive tapes, such as ultraviolet absorbers, photostabilizers, antioxidants, fillers, pigments, and dyes.

If necessary, the substrate may also be appropriately subjected to a release treatment with any of release agents such as silicone-based, fluorine-based, long chain alkyl-based, and fatty acid amide-based release agents or a silica powder; any of adhesion facilitating treatments such as an antifouling treatment, an acid treatment, an alkali treatment, a primer treatment, a corona discharge treatment, a plasma treatment, and an ultraviolet treatment; or any of antistatic treatments such as coating-type, kneading-type, and vapor deposition-type antistatic treatments.

The thickness of the substrate (backing) may be arbitrarily selected depending on the material or shape of the substrate. For example, it is preferably from about 5 to about 200 µm, more preferably from about 10 to about 100 µm.

The method of forming the pressure-sensitive adhesive layer may be based on a known pressure-sensitive adhesive sheet-manufacturing method, examples of which include, but are not limited to, a method including applying a pressure-sensitive adhesive composition (a solution of a pressure-sensitive adhesive composition in a solvent or a hot melt of a pressure-sensitive adhesive composition) to the substrate (backing) and drying the coating to form a pressure-sensitive adhesive layer, a method of transferring a formed pressure-sensitive adhesive layer, a method of extruding and applying a pressure-sensitive adhesive layer-forming material onto the substrate (backing), a method of extruding the substrate (backing) and a pressure-sensitive adhesive layer in two or more layers, and a method of laminating the substrate (backing) with a single pressure-sensitive adhesive layer. A co-extruding method or the like may also be used, in which a thermoplastic resin substrate (backing) and a pressure-sensitive adhesive layer are extruded in two or more layers by inflation molding or T-die molding. In the invention, the pressure-sensitive adhesive sheet may also include a pressure-sensitive adhesive film, a pressure-sensitive adhesive tape, or the like.

The pressure-sensitive adhesive composition (solution) may be applied using a conventionally known method such as roll coating, gravure coating, reverse roll coating, roll brush coating, air knife coating, spray coating, or extrusion coating with a die coater or the like.

The surface-protecting pressure-sensitive adhesive sheet of the invention can be widely used in conventionally well-known surface protection applications, and its load on the global environment is relatively small when it is disposed after use. In particular, therefore, the surface-protecting pressure-sensitive adhesive sheet of the invention is preferably used in surface-protecting pressure-sensitive adhesive sheet applications where the sheet is peeled off and incinerated after use.

EXAMPLES

Hereinafter, the invention is described in more detail with reference to the Examples, which are not intended to limit the invention. In the examples, the term "parts" means "parts by weight." The formulations and the results of evaluation are shown in Tables 1 to 3. In Table 1, the content of each monomer component used in the polyester synthesis is shown in units of % by mole, and in Tables 2 and 3, each added amount is shown in parts by weight.

Preparation of Polyester A

To a reaction can equipped with a stirrer, a thermometer, and a drain condenser were added 86 parts of dimer acid, 10 parts of sebacic acid, 30 parts of 1,3-propylene glycol, 0.4 parts of trimethylolpropane, 50 parts of DL-lactide, and 0.014 parts of tetrabutyl titanate and 0.014 parts of tin octylate as polymerization catalysts. After the temperature was raised to 250° C. over 5 hours in a nitrogen atmosphere at normal pressure, the mixture was allowed to react for 1 hour, in which esterification was performed while distilled water was removed out of the system. The pressure was further reduced to 10 mmHg over 30 minutes, and early-stage polymerization was performed at 250° C. for 30 minutes. The pressure was further reduced to 1 mmHg over 30 minutes, and late-stage polymerization was performed at 250° C., so that a polyester A was obtained.

Preparation of Polyester B

A polyester B was obtained similarly to the polyester A using 100 parts of dimer acid, 5.6 parts of sebacic acid, 20 parts of neopentyl glycol, 1.0 part of trimethylolpropane, 21 parts of DL-lactide, and 0.014 parts of tetrabutyl titanate and 0.014 parts of tin octylate as polymerization catalysts.

Preparation of Polyester C

A polyester C was obtained similarly to the polyester A using 100 parts of dimer acid, 11 parts of sebacic acid, 17 parts of 1,3-propylene glycol, 10.8 parts of trimethylolpropane, and 0.014 parts of tetrabutyl titanate and 0.014 parts of tin octylate as polymerization catalysts.

Preparation of Polyester D

To a reaction can equipped with a stirrer, a thermometer, and a drain condenser were added 100 parts of DL-lactide, 53 parts of ε-caprolactone, 0.2 parts of neopentyl glycol, and 0.010 parts of tetrabutyl titanate and 0.010 parts of tin octylate as polymerization catalysts. After the temperature was raised to 180° C. over 5 hours in a nitrogen atmosphere at normal pressure, the mixture was further allowed to react for 3 hours. Subsequently, the pressure was reduced to 10 mmHg over 30 minutes, and further reduced to 1 mmHg over 30 minutes. Polymerization was performed at 180° C., while the lactide residue was removed, so that a polyester D was obtained.

Preparation of Polyester E

A polyester E was obtained similarly to the polyester D using 100 parts of DL-lactide, 118 parts of ε-caprolactone, 0.2 parts of ethylene glycol, and 0.010 parts of tetrabutyl titanate and 0.010 parts of tin octylate as polymerization catalysts.

Preparation of Pressure-Sensitive Adhesive Composition

Example 1

In a mixed solvent of 117 parts of methyl ethyl ketone (MEK) and 117 parts of ethyl acetate were dissolved 92 parts of the polyester A and 8 parts of a dried, branched polyester oligomer (Hyperbranched Polymer BOLTORN H20, manufactured by Perstorp, 500 mgKOH/g in hydroxyl value, 2,100 in weight average molecular weight). Subsequently, 10 parts of polyisocyanurate (CORONATE HK, manufactured by Nippon Polyurethane Industry Co., Ltd.) as a crosslinking agent and 0.1 parts of dioctyltin dilaurate (EMBILIZER OL-1, manufactured by Tokyo Fine Chemical CO., LTD.) as a catalyst were added to the solution. The resulting mixture was applied onto a 25 μm thick polylactic acid film (TERRAMAC, manufactured by UNITIKA LTD.) as a substrate so that a 5 μm thick coating could be formed after drying. After the coating was dried at 80° C. for 3 minutes, the composition layer was bonded to the release-treated surface of a release-treated polyethylene terephthalate film. The resulting laminate was further allowed to stand at 50° C. for 5 days, so that a pressure-sensitive adhesive sheet was obtained.

Example 2

A pressure-sensitive adhesive sheet was obtained by the same process as in Example 1, except that 8 parts of a branched polyester oligomer (Hyperbranched Polymer BOLTORN H40, manufactured by Perstorp, 490 mgKOH/g in hydroxyl value, 5,100 in weight average molecular weight) was added instead.

Example 3

A pressure-sensitive adhesive sheet was obtained by the same process as in Example 1, except that 92 parts of the polyester B was added in place of the polyester A.

Comparative Example 1

A pressure-sensitive adhesive sheet was obtained by the same process as in Example 1, except that the polyester A was added in an amount of 100 parts without addition of the branched polyester oligomer.

Comparative Example 2

A pressure-sensitive adhesive sheet was obtained by the same process as in Comparative Example 1, except that 100 parts of the polyester D was added in place of the polyester A without addition of the catalyst.

Comparative Example 3

A pressure-sensitive adhesive sheet was obtained by the same process as in Comparative Example 1, except that 100 parts of the polyester E was added in place of the polyester A.

Comparative Example 4

A pressure-sensitive adhesive sheet was obtained by the same process as in Example 1, except that 92 parts of the polyester C was added in place of the polyester A.

The composition of each polyester is shown in Table 1, and the results of the evaluation of the molecular weight and so on of the polyesters are shown in Table 2. The results of the evaluation of the pressure-sensitive adhesive layers (pressure-sensitive adhesive sheets) produced using the polyesters are shown in Table 3.

(Composition of Polyester)

The polyester was dissolved in chloroform-D, and the composition of the polyester was analyzed by subjecting the solution to $^1$H-NMR analysis using a nuclear magnetic resonance (NMR) analyzer 400-MR manufactured by Varian, Inc.

(Molecular Weight)

The number average molecular weight (Mn) and the weight average molecular weight (Mw) were determined as described below. About 0.2 g of the polyester or a mixture of the polyester and the branched polyester oligomer was placed in a petri dish and dried at 120° C. for 2 hours so that the solvent was removed by drying. Subsequently, 0.01 g of the polyester layer (or the layer of a mixture of the polyester and the branched polyester oligomer) on the petri dish was weighed, then added to 10 g of tetrahydrofuran (THF), and allowed to stand for 24 hours so that it was dissolved. The solution was subjected to gel permeation chromatography (GPC) method, and each molecular weight was determined from the calibration curve obtained using polystyrene standards.

(Measurement Conditions)

Analyzer: HLC-8220GPC, manufactured by TOSOH CORPORATION
Sample concentration: 0.1% by weight (THF solution)
Sample injection volume: 20 μl
Eluent: THF
Flow rate: 0.300 ml/minute
Measurement (column) temperature: 40° C.
Columns: sample column, TSKGUARDCOLUMN SUPERHZ-L(single) TSKGEL SUPERHZM M(double);

reference column, TSKGEL SUPERH-RC(single), each manufactured by TOSOH CORPORATION
Detector: differential refractometer (RI)

(Glass Transition Temperature of Polyester)

The glass transition temperature (Tg (° C.)) was determined using a differential scanning calorimeter (DSC-220 (product name), manufactured by Seiko Instruments Inc.) under the following measurement conditions: 5 mg of a measurement sample placed in an aluminum pan; temperature, −120 to 150° C.; temperature rise rate, 20° C./minute.

(Hydroxyl Value of Polyester and Polyester-Based Pressure-Sensitive Adhesive Composition)

About 0.5 g of a sample of the polyester or the polyester-based pressure-sensitive adhesive composition was placed in a 250 ml Erlenmeyer flask and weighed. Subsequently, 20.00 ml of a solution prepared by mixing acetic anhydride and anhydrous pyridine in a ratio of 1:10 (weight ratio) was added to the Erlenmeyer flask, and a condenser was attached thereto. The mixture was refluxed under stirring for 20 minutes and then cooled to room temperature. Subsequently, 20 ml of acetone and 20 ml of distilled water were added to the Erlenmeyer flask through the condenser. After a phenolphthalein indicator was added thereto, the mixture was titrated with an aqueous 1.00 N (normal) sodium hydroxide solution. The hydroxyl value (mgKOH/g) was calculated by subtracting the result of additional measurement of a blank (containing no sample) from the result of the titration.

(Acid Value of Polyester and Polyester-Based Pressure-Sensitive Adhesive Composition)

In 20 ml of chloroform was dissolved 0.2 g of a sample of the polyester or the polyester-based pressure-sensitive adhesive composition. Using phenolphthalein as an indicator, the solution was titrated with a 0.1 N (normal) potassium hydroxide-ethanol solution, and the acid value (mgKOH/g) was calculated.

(Biomass Degree)

The percentage of the weight of the plant-derived raw materials used to the weight of all raw materials used was calculated and used as the biomass degree (%) in the evaluation.

Biomass degree (%)=100×(the weight of the plant-derived raw materials used)/(the weight of all raw materials used)

(Storage Modulus)

The pressure-sensitive adhesive layer was formed on a release liner (MRF38, manufactured by Mitsubishi Polyester Film Corporation, 38 μm in thickness), and the pressure-sensitive adhesive layer was shaped into a 3 mm thick, 8 mmφ diameter, test sample. Subsequently, the test sample was sandwiched between parallel plates with a diameter of 7.9 mm (for shearing test), and the storage modulus (G' (Pa)) of the sample was measured at 23° C. using a viscoelasticity tester ARES manufactured by Rheometric Scientific Inc., while shearing strain was applied thereto at a frequency of 1 Hz.

(Initial Adhesive Strength)

The pressure-sensitive adhesive layer was prepared with a thickness of 50 μm and bonded onto a polylactic acid film (TERRAMAC, manufactured by UNITIKA LTD., 25 μm in thickness), so that a test sample of 100 mm long×20 mm wide was prepared. Subsequently, the test sample was bonded (press-bonded) to an acrylic plate (ACRYLITE, manufactured by Mitsubishi Rayon Co., Ltd., 2 mm in thickness) by one reciprocation of a roller under a pressure of 2 kg, and measured for adhesive strength (N/20 mm) at a rate of pulling of 300 mm/minute according to JIS C 2107. The initial adhesive strength at 23° C., a peel angle of 180° C. with respect to the acrylic plate, and a rate of pulling of 300 mm/minute is preferably from 0.1 to 0.5 N/20 mm, more preferably from 0.2 to 0.4 N/20 mm. If the initial adhesive strength is less than 0.1 N/20 mm, the adhesive strength to the adherend may be insufficient, so that peeling may occur during use. An adhesive strength of more than 0.5 N/20 mm is not preferred, because such an adhesive strength may be too high so that when the surface-protecting pressure-sensitive adhesive sheet is peeled off after use, an adhesive deposit may be formed on the adherend, or the substrate (backing) may be broken.

(Adhesive Strength after Heat Storage)

A test sample was obtained as in the case of the initial adhesive strength test and stored at 40° C. for 30 days and then allowed to stand at 23° C. for 6 hours. Thereafter, the adhesive strength after the heat storage was measured by the same method as in the case of the initial adhesive strength. The adhesive strength is preferably from 0.1 to 1.0 N/20 mm, more preferably from 0.3 to 0.5 N/20 mm. If the adhesive strength is less than 0.1 N/20 mm, the adhesive strength may be insufficient so that peeling may occur during use. An adhesive strength of more than 1.0 N/20 mm is not preferred, because when the surface-protecting pressure-sensitive adhesive sheet is peeled off after use, an adhesive deposit may be formed on the adherend, or the substrate (backing) may be broken.

(Presence or Absence of Staining of Adherend)

A solution of the pressure-sensitive adhesive composition was applied to a polylactic acid film (TERRAMAC, manufactured by UNITIKA LTD., 25 μm in thickness), and dried to form a 5 μm thick pressure-sensitive adhesive layer, so that a pressure-sensitive adhesive sheet was obtained. A 10 mm×30 mm cut piece of the sheet was bonded (press-bonded) to a black acrylic plate (ACRYLITE (black), manufactured by Mitsubishi Rayon Co., Ltd., 2 mm in thickness) by allowing it to pass through a laminator once under a pressure of 2 kg, so that a test sample was obtained. The test sample was allowed to stand in an 80° C. atmosphere for 3 days and then allowed to stand in a 23° C. atmosphere for 4 hours. Subsequently, the sample piece was peeled off by hand, and the presence or absence of staining of the surface of the adherend was visually checked, while fluorescent light was applied to the adherend in a darkroom, after the pressure-sensitive adhesive sheet was peeled off.

(Gel Fraction)

The pressure-sensitive adhesive sheet (with a 50 μm thick pressure-sensitive adhesive layer) obtained in each of the examples and the comparative examples was cut into a 5 cm×5 cm square piece. The cut piece sample was wrapped in a TEFLON(registered trademark) sheet whose weight was known, and the total weight was measured. The wrapped sample was allowed to stand in toluene at 23° C. for 7 days, so that the sol fraction was extracted from the sample. Subsequently, the sample was dried at 120° C. for 2 hours, and the dried weight was measured. The gel fraction was calculated from the following formula:

gel fraction (%)={(the weight after drying−the weight of the TEFLON sheet)/(the weight before drying−the weight of the TEFLON sheet)}×100

TABLE 1

| Compositions for synthesis of polyesters and results of evaluation of polyesters | | Polyester | | | | |
|---|---|---|---|---|---|---|
| | | A | B | C | D | E |
| Dibasic acid component | Dimer acid | 30 | 32 | 38 | | |
| | Sebacic acid | 10 | 5 | 12 | | |
| Glycol component | 1,3-propylene glycol | 39 | | 48 | | |
| | Ethylene glycol | | | | | 0.2 |
| | Neopentyl glycol | | 35 | | 0.2 | |
| | Trimethylolpropane | 1 | 2 | 2 | | |
| Lactic acid | DL-lactide | 20 | 26 | | 60 | 40 |
| Copolymerized component | ε-caprolactone | | | | 39.8 | 59.8 |
| Tg | (° C.) | −54 | −53 | −58 | −15 | −39 |
| Hydroxyl value | mgKOH/g | 6 | 9 | 42 | 6 | 0.6 |
| Acid value | mgKOH/g | 0.6 | 0.6 | 0.6 | 0.6 | 1.1 |
| Weight average molecular weight (Mw) | | 153,000 | 185,000 | 153,000 | 74,000 | 83,000 |
| Dispersity (Mw/Mn) | | 5.3 | 6 | 5.9 | 1.4 | 1.7 |

TABLE 2

| Results of evaluation of polyester-based pressure-sensitive adhesive composition | | Example | | | Comparative Example | | | |
|---|---|---|---|---|---|---|---|---|
| | | 1 | 2 | 3 | 1 | 2 | 3 | 4 |
| Polyester | A | 92 | 92 | | 100 | | | |
| | B | | | 92 | | | | |
| | C | | | | | | | 92 |
| | D | | | | | 100 | | |
| | E | | | | | | 100 | |
| Branched polyester oligomer | H20 | 8 | | 8 | | | | 8 |
| | H40 | | 8 | | | | | |
| Weight average molecular weight (Mw) | | 168,000 | 154,000 | 185,000 | 153,000 | 74,000 | 83,000 | 153,000 |
| Dispersity (Mw/Mn) | | 5.3 | 6.6 | 6.0 | 5.3 | 1.4 | 1.7 | 5.9 |
| Tg | ° C. | −54 | −54 | −53 | −54 | −15 | −39 | −58 |
| Hydroxyl value | mgKOH/g | 43 | 42 | 20 | 6 | 6 | 0.6 | 42 |
| Acid value | mgKOH/g | 0.5 | 0.6 | 0.6 | 0.6 | 0.6 | 1.1 | 0.6 |
| Biomass degree | wt % | 83.2 | 83.2 | 71.6 | 90.5 | 59.5 | 41.6 | 83.1 |

TABLE 3

| Results of evaluation of pressure-sensitive adhesive layer (pressure-sensitive adhesive sheet) | | Example | | | Comparative Example | | | |
|---|---|---|---|---|---|---|---|---|
| | | 1 | 2 | 3 | 1 | 2 | 3 | 4 |
| Polyester | A | 92 | 92 | | 100 | | | |
| | B | | | 92 | | | | |
| | C | | | | | | | 92 |
| | D | | | | | 100 | | |
| | E | | | | | | 100 | |
| Branched polyester oligomer | H20 | 8 | | 8 | | | | 8 |
| | H40 | | 8 | | | | | |
| Crosslinking agent | CORONATE HK | 10 | 10 | 10 | 10 | 10 | 10 | 10 |
| Catalyst | OL-1 | 0.1 | 0.1 | 0.1 | 0.1 | — | 0.1 | 0.1 |
| Gel fraction | wt % | 88 | 87 | 88 | 84 | 94 | 91 | 90 |
| Initial adhesive strength | N/20 mm | 0.2 | 0.2 | 0.2 | 3.0 | 0.8 | 0.9 | 0.2 |

TABLE 3-continued

| Results of evaluation of pressure-sensitive adhesive layer (pressure-sensitive adhesive sheet) | | Example | | | Comparative Example | | | |
|---|---|---|---|---|---|---|---|---|
| | | 1 | 2 | 3 | 1 | 2 | 3 | 4 |
| Adhesive strength (after heat storage) | N/20 mm | 0.3 | 0.4 | 0.3 | 5.0 | 2.0 | 3.0 | 0.3 |
| Storage modulus | ×10$^5$ Pa | 4.3 | 4.0 | 2.2 | 2.3 | 4.2 | 8.3 | 3.0 |
| Staining of adherend (absent: ○, present: x) | | ○ | ○ | ○ | x | x | x | x |

From the evaluation results in Tables 1 to 3, it was demonstrated that in Examples 1 to 3, pressure-sensitive adhesive layers each having a desired gel fraction, a desired adhesive strength, and a desired storage modulus were successfully obtained, and the surface-protecting pressure-sensitive adhesive sheets produced using the pressure-sensitive adhesive layers had high resistance to staining, because no adhesive deposit was observed after they were each bonded to the adherend and then peeled off. In addition, high biomass degrees were shown, so that global environmentally-friendly surface-protecting pressure-sensitive adhesive sheets were successfully obtained.

In contrast, in Comparative Example 1 where the hydroxyl value of the polyester-based pressure-sensitive adhesive composition was out of the desired range, the resulting pressure-sensitive adhesive layer had a problem with gel fraction and adhesive strength, and the pressure-sensitive adhesive sheet produced using the pressure-sensitive adhesive layer was found to have low resistance to staining. In Comparative Example 2 where the glass transition temperature of the polyester and the hydroxyl value of the polyester-based pressure-sensitive adhesive composition were each out of the desire range, the resulting pressure-sensitive adhesive layer had a problem with adhesive strength, and the pressure-sensitive adhesive sheet produced using the pressure-sensitive adhesive layer was found to have low resistance to staining and also found not to be global environmentally-friendly, because of the low biomass degree. In Comparative Example 3 where no dibasic acid was used in the synthesis of the polyester and the hydroxyl value of the polyester-based pressure-sensitive adhesive composition was out of the desired range, the resulting pressure-sensitive adhesive layer had a problem with adhesive strength, and the pressure-sensitive adhesive sheet produced using the pressure-sensitive adhesive layer was found to have low resistance to staining and also found not to be global environmentally-friendly, because of the low biomass degree. In Comparative Example 4 where no lactic acid was used in the synthesis of the polyester, the pressure-sensitive adhesive sheet produced using the polyester was found to have low resistance to staining.

The invention claimed is:

1. A surface-protecting pressure-sensitive adhesive sheet, comprising:
    a substrate; and
    a pressure-sensitive adhesive layer that is provided on at least one side of the substrate and made from a polyester-based pressure-sensitive adhesive composition comprising a crosslinking agent and a polyester comprising at least a lactic acid unit, a dibasic acid unit, and a glycol unit, wherein
    the dibasic acid unit comprises a dimer acid,
    the polyester has a weight average molecular weight of 20,000 to 200,000 and a glass transition temperature of −70 to −20° C. as measured using a differential scanning calorimeter at a temperature rise rate of 20° C./minute,
    the polyester-based pressure-sensitive adhesive composition has a hydroxyl value of 20 to 60 mgKOH/g,
    the pressure-sensitive adhesive layer has a gel fraction of 85 to 99% by weight, and
    the pressure-sensitive adhesive layer has a storage modulus of 1×10$^4$ to 1×10$^7$ Pa as measured using a dynamic viscoelasticity meter under the conditions of 23° C. and a frequency of 1 Hz.

2. The surface-protecting pressure-sensitive adhesive sheet according to claim 1, wherein the polyester contains 10 to 50% by mole of the lactic acid unit and 50 to 90% by mole of the components other than the lactic acid unit, and the molar ratio of the dibasic acid unit to the glycol unit is 1:0.8 to 1:1.2.

3. The surface-protecting pressure-sensitive adhesive sheet according to claim 1, wherein the dibasic acid unit further comprises an aliphatic dibasic acid other than the dimer acid.

4. The surface-protecting pressure-sensitive adhesive sheet according to claim 1, wherein the polyester comprises a tri- or polyfunctional carboxylic acid and/or polyol component as a component other than the lactic acid unit, the dibasic acid unit, and the glycol unit, and the polyester has a dispersity (Mw/Mn) of 2.5 to 10.0.

5. The surface-protecting pressure-sensitive adhesive sheet according to claim 1, wherein the polyester has a hydroxyl value of 2 to 50 mgKOH/g.

6. The surface-protecting pressure-sensitive adhesive sheet according to claim 1, wherein the polyester-based pressure-sensitive adhesive composition further comprises a branched polyester oligomer with a hydroxyl value of 100 to 1,000 mgKOH/g, and the composition comprises 50 to 99 parts by weight of the polyester and 1 to 50 parts by weight of the branched polyester oligomer.

7. The surface-protecting pressure-sensitive adhesive sheet according to claim 1, wherein the crosslinking agent is a polyvalent isocyanurate.

8. The surface-protecting pressure-sensitive adhesive sheet according to claim 1, which has an initial adhesive strength of 0.1 to 0.5 N/20 mm at 23° C., a peel angle of 180° with respect to an acrylic plate, and a rate of pulling of 300 mm/minute, and has an adhesive strength of 0.1 to 1.0 N/20 mm after storage at 40° C. for 30 days.

9. The surface-protecting pressure-sensitive adhesive sheet according to claim 1, wherein the substrate is biodegradable.

* * * * *